(12) United States Patent
Opitz et al.

(10) Patent No.: US 11,444,355 B2
(45) Date of Patent: Sep. 13, 2022

(54) BATTERY DEVICE, BATTERY SYSTEM AND METHOD FOR ASSEMBLING A BATTERY SYSTEM

(71) Applicant: AUDI AG, Ingolstadt (DE)

(72) Inventors: Uwe Opitz, Karlshuld (DE); Michael Hinterberger, Großmehring (DE); Bernhard Rieger, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 267 days.

(21) Appl. No.: 16/615,569

(22) PCT Filed: May 9, 2018

(86) PCT No.: PCT/EP2018/062062
§ 371 (c)(1),
(2) Date: Nov. 21, 2019

(87) PCT Pub. No.: WO2018/233927
PCT Pub. Date: Dec. 27, 2018

(65) Prior Publication Data
US 2020/0220127 A1 Jul. 9, 2020

(30) Foreign Application Priority Data

Jun. 21, 2017 (DE) ...................... 10 2017 210 357.4

(51) Int. Cl.
*H01M 50/20* (2021.01)
*H01M 50/24* (2021.01)
(Continued)

(52) U.S. Cl.
CPC ......... *H01M 50/20* (2021.01); *H01M 10/425* (2013.01); *H01M 10/482* (2013.01);
(Continued)

(58) Field of Classification Search
CPC ..................................................... H01M 50/20
See application file for complete search history.

(56) References Cited

U.S. PATENT DOCUMENTS

| 8,994,300 B2 | 3/2015 | Ohkura | |
|---|---|---|---|
| 2004/0168818 A1* | 9/2004 | Layden | H02J 7/0031 174/50 |

(Continued)

FOREIGN PATENT DOCUMENTS

| CN | 102197531 A | 9/2011 |
|---|---|---|
| CN | 102792483 A | 11/2012 |

(Continued)

OTHER PUBLICATIONS

English-language translation of International Preliminary Report on Patentability dated Jan. 2, 2020, in corresponding International Application No. PCT/EP2018/062062; 7 pages.

(Continued)

*Primary Examiner* — Brian R Ohara
(74) *Attorney, Agent, or Firm* — Maier & Maier, PLLC

(57) ABSTRACT

A battery device with a battery module that includes multiple secondary cells, and the battery module is provided with a positive pole and a negative pole. Moreover, the battery module is placed inside an insulating housing with a contact element, which is connected to the positive pole and to the negative pole and through which the positive pole and the negative pole may be connected to an electronics unit of a battery system. Moreover, the invention relates to a battery system and a method for assembling a battery system.

7 Claims, 2 Drawing Sheets

(51) Int. Cl.
  *H01M 50/502* (2021.01)
  *H01M 50/543* (2021.01)
  *H01M 10/42* (2006.01)
  *H01M 10/48* (2006.01)

(52) U.S. Cl.
  CPC ......... *H01M 50/24* (2021.01); *H01M 50/502* (2021.01); *H01M 50/543* (2021.01); *H01M 2010/4271* (2013.01); *H01M 2220/10* (2013.01); *H01M 2220/20* (2013.01)

(56) References Cited

U.S. PATENT DOCUMENTS

| | | | | |
|---|---|---|---|---|
| 2009/0317696 | A1* | 12/2009 | Chang | H01M 10/48 429/61 |
| 2010/0185405 | A1* | 7/2010 | Aoshima | H01M 10/482 702/63 |
| 2012/0003507 | A1* | 1/2012 | Krieg | H01M 10/4207 429/150 |
| 2013/0108905 | A1* | 5/2013 | Murakami | H01M 10/482 429/90 |
| 2013/0164580 | A1 | 6/2013 | Au | |
| 2014/0011056 | A1* | 1/2014 | Adachi | H01M 50/10 429/7 |

FOREIGN PATENT DOCUMENTS

| | | |
|---|---|---|
| CN | 103717433 A | 4/2014 |
| DE | 201 22 043 U1 | 2/2004 |
| DE | 10 2011 076 981 A1 | 12/2012 |
| DE | 20 2012 104 578 U1 | 1/2013 |
| DE | 10 2011 089 135 A1 | 6/2013 |
| DE | 10 2012 209 834 A1 | 12/2013 |
| DE | 10 2013 107 029 A1 | 1/2014 |
| DE | 10 2014 014 186 A1 | 3/2015 |
| EP | 1 864 351 B1 | 9/2012 |
| JP | 2013109977 A | 6/2013 |

OTHER PUBLICATIONS

Examination Report dated Mar. 29, 2018 in corresponding German application No. 10 2017 210 357.4; 20 pages.
International Search Report and Written Opinion of the International Searching Authority dated Jul. 27, 2018 in corresponding International application No. PCT/EP2018/062062; 25 pages.
"Starterbatterie—Limora Oldtimer GmbH & Co. KG"; URL: www.limora.com/de/starterbatterie-1-8829.html; 8 pages.
Office Action dated Nov. 17, 2021, in connection with corresponding Chinese Application No. 201880041687.X (15 pp., including machine-generated English translation).

* cited by examiner

BATTERY DEVICE, BATTERY SYSTEM AND METHOD FOR ASSEMBLING A BATTERY SYSTEM

FIELD

The invention relates to a battery device, a battery system as well as a method for assembling a battery system according to the preambles of the independent claims.

BACKGROUND

A battery device is known from EP 1 864 351 B1, which is provided with a battery module comprising multiple secondary cells. The battery module in turn is provided with a positive pole and a negative pole. Said battery module is provided with a plurality of secondary cells, in particular lithium-iron cells, which are connected in series electrically. To facilitate the electrical connection of the battery module to other elements of the battery device, the battery module is provided with the electrically conductive elements of positive pole and negative pole.

An electrical cabinet is known from DE 201 22 043 U1 for the configuration of an uninterruptable power supply. The electrical cabinet comprises a plurality of receptacles, each of which is provided with at least one connector attachment, and which are designed to house a power module or a battery column.

Moreover, DE 20 2012 104 578 U1 discloses a modular battery framework for holding multiple batteries. The individual batteries may be wired from the front of the battery framework. This facilitates the interconnection of the batteries.

SUMMARY

It is the object of the present invention to provide a battery device, a battery system as well as a method for assembling a battery system, providing a particularly safe manner for handling a battery module.

Said object is met, according to the invention, by a battery device, a battery system as well as a method for assembling a battery system.

To enable a particularly safe handling of a battery module by means of a battery device of the kind described at the outset provision is made, according to the invention, that the battery module is retained in an insulating housing with a contact element, which is connected to the positive and negative pole and through which the positive and negative pole may be connected to an electronics unit of a battery system. In other words, the battery module is at least essentially fully enclosed by the insulating housing. The contact element of the insulating housing is connected to the positive and negative pole of the battery module. Thus, through a connection with the electronics unit of the battery system via the contact element a connection of the positive and negative pole of the battery module to the electronics unit can be established. Advantageously, the battery module may be connected via the contact element to the electronics unit in a particularly simple manner since the positive and negative poles may be connected jointly and at the same time via the contact element to the electronics unit. Moreover, the battery module, which is retained in the insulating housing, can be handled particularly safely since the insulating housing acts as contact protection of the battery module for a user. The danger to the user of experiencing an electric shock is thus particularly low.

In this respect it has proven to be advantageous if the housing is comprised of an acid-proof material. The battery module is in particular at least essentially fully enclosed by the acid-proof material of the housing. In the instance of acid leakage from a battery module, the acid escaped from the battery module can be retained by the housing. Risk of injury to the user due to the escaped acid can be kept particularly low since said acid is caught in the housing. Since the housing material is acid-proof, the acid may advantageously be retained in the housing for a long period so that the user is protected for a long time from the acid.

An advantageous embodiment of the invention provides that the battery module retained in the housing is a traction battery or a starter battery for a motor vehicle. This has the advantage that the traction battery or the starter battery for the motor vehicle can be handled particularly safely and particularly simply due to the insulating housing.

In a further advantageous embodiment of the invention provision is made that the contact element comprises a contactor. Said contactor is an electrically or pneumatically operable switch that can be moved between two switch positions. By means of the contactor it can be ensured that electric power is only made available outside the housing from the contact element when a connection with the electronics unit of the battery system is established. This, advantageously, makes it possible to prevent electric power from being transferred from the battery module to the user, should said user come in contact with the contact element.

A further aspect of the invention relates to a battery system with a framework that has a number of receptacles, each of which is able to retain a battery module. Moreover, the battery system comprises an electronics unit, which is disposed on said framework, and by means of which the respective battery modules may be interconnected and controlled. Furthermore, the battery system is provided with a contact device by means of which the respective battery module may be connected to the electronics unit. To facilitate a particularly safe handling of the battery system, a battery device as described in connection with the battery device according to the invention, is disposed in at least one of the receptacles. Through this the contact element of the battery module may be brought into contact with the contact device, and the positive and negative poles may be connected via the contact element and the contact device to the electronics unit. In particular, each of the battery modules retained in the receptacles of the framework, is the battery device according to the invention. This results in the advantage that the respective battery modules, due to their arrangement inside the insulating housing, can be handled in a particularly safe manner and thus can be arranged particularly safely in the framework to create the battery system. To facilitate a particularly simple interconnection of the respective battery modules, they are able to make contact via the respective contact elements of the housings of the contact device of the framework that retain the battery modules, wherein said contact device is in turn connected to the electronics unit. Through that the respective positive and negative poles of the battery modules may be connected with the electronics unit so that the battery modules can be interconnected and controlled.

In this respect it has proven to be advantageous if the contact element and/or the contact device comprises a contactor. If the contact element comprises said contactor, the transfer of electrical energy from the respective battery module to the user may essentially be prevented so that the user is not exposed to any health hazards. If the contact element comprises said contactor, electrical energy is advantageously only transmitted from the electronics unit if the contact device is in contact with the contact element. A transfer of electrical energy from the electronics unit via the contact device to the user, for example, may at least essentially be prevented through the arrangement of the contactor on the contact device even when contact is made between the user and the contact device. This provides a particularly high level of safety to the user when handling the battery system.

In an advantageous embodiment of the invention provision is made that the battery system is designed as a stationary storage battery for the purpose of balancing out load spikes in a power grid. For example, a stationary storage battery may be used to balance out the energy requirement of a production plant, wherein the production plant is at times supplied with energy from the storage battery and at other times with energy from the power grid. Alternatively, or in addition, the storage battery may be used to take up energy when there is excess power available in the grid, and to release energy back to the grid in the instance of a power shortage, that is, to feed back into the grid. This may, for example, provide financial advantages in that the balancing out of load spikes in the power grid is reimbursed by an electricity supplier, or energy costs are reduced through balancing out the energy requirement of the production plant.

A further aspect of the invention concerns a method for assembling a battery system in which a battery module, comprised of multiple secondary cells, is provided with a positive and a negative pole and is disposed in a receptacle of a framework. In this instance the positive and negative poles make contact with a contact device of the receptacle, which connects the positive and negative poles to an electronics unit. The electronics unit is then used to control and interconnect the battery module with at least one further battery module. To facilitate a particularly safe handling of the battery module or the battery system respectively, the battery module is placed inside an insulating housing with a contact element prior to its arrangement in the receptacle. The contact element is connected to the positive and negative poles and connects the positive and negative poles via the contact device with the electronics unit. In other words, the battery module is first disposed in the insulating housing and the positive and negative poles of the battery module are connected to the contact element of the housing. The battery module disposed inside the housing is then placed into the receptacle of the framework and the contact element is connected to the contact device. This connects the positive and negative poles via the contact device to the electronics unit. The electronics unit then controls and interconnects the battery module with at least one further battery module, which is disposed in an insulating housing and is arranged in a further receptacle of the framework. By placing the battery module inside the insulating housing it can be handled in a particularly safe and simple manner by a user.

Included in the invention are also advantages and further developments of the method according to the invention which exhibit characteristics that have already been described in connection with the advantages and further developments of the battery device according to the invention as well as the battery system according to the invention. Thus, the respective advantages and further developments of the method according to the invention are not described here again.

BRIEF DESCRIPTION OF THE DRAWINGS

The following describes exemplary embodiments of the invention. Shown are in.

DETAILED DESCRIPTION

The exemplary embodiments described below are preferred embodiments of the invention. In the exemplary embodiments the described components of the embodiments each constitute individual characteristics of the invention that are to be considered independently from each other, each of which develops the invention further independently from each other, and thus they are to be considered as a component of the invention individually or in a combination other than in the one shown. Moreover, the described embodiments may also be supplemented through further of the already described characteristics of the invention.

Functionally equal elements are provided with the same reference numbers in the figures.

Figure 1:
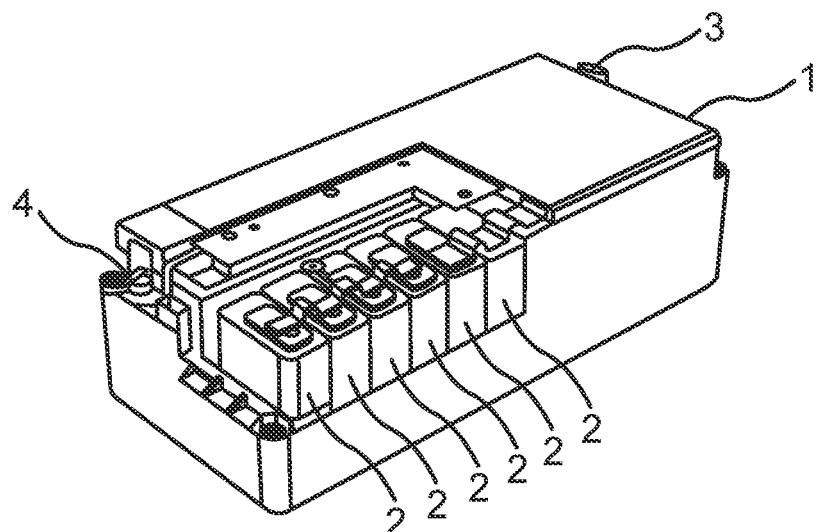
FIG. 1 a perspective view of a battery module with a negative and a positive pole.

FIG. 1 depicts a schematic perspective view of a battery module 1. The battery module 1 may be a module for a traction battery or for a starter battery for a motor vehicle. The battery module 1 comprises multiple secondary cells 2, which may be connected in parallel and/or in series. Moreover, the battery module 1 is provided with a positive pole 3 and a negative pole 4.

Figure 2:
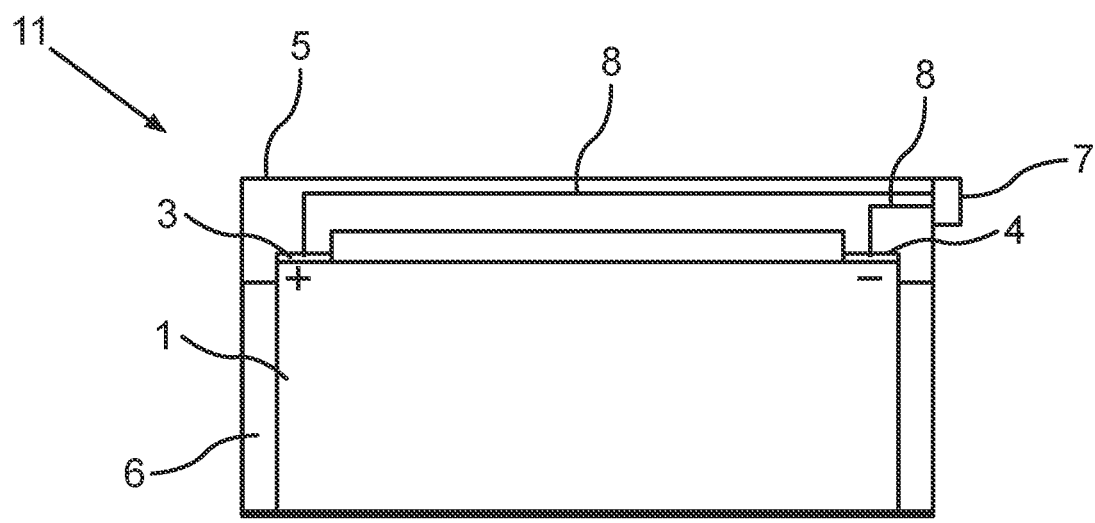
FIG. 2 a schematic cross-sectional view of a battery device with the battery module according to FIG. 1, which is located within an insulating housing with a contact element.

To facilitate a particularly safe handling of the battery module 1, said battery module 1 is disposed inside an insulating housing 5 as shown in a schematic cross-sectional view in FIG. 2. The insulating housing 5 is comprised here of an acid-proof material. The battery module 1 may also be embedded in an additional insulating layer 6 in housing 5, for example. The insulating housing 5 comprises, moreover, a contact element 7, which is connected via respective connecting lines 8 to the positive pole 3 and to the negative pole 4. The positive pole 3 and the negative pole 4 may be connected via the contact element 7 to an electronics unit 9 of a battery system 10. The contact element 7 may, for example, comprise a contactor through which electrical energy may be transferred from the positive pole 3 and the negative pole 4 to the electronics unit 9 simply by connecting the contact element 7 to the electronics unit 9.

The insulating housing 5 shown in FIG. 1 provides contact protection for a user for a particularly safe handling of the battery module 1. This means that, due to the arrangement of the battery module 1 inside housing 5, it can be ensured that the user is not able to directly touch the battery module 1. This facilitates the hazard-free assembly of the battery system 10 from multiple battery devices 11, which are the respective battery modules 1 disposed inside the insulating housing 5.

In an assembly process, the battery module (1), which comprises multiple secondary cells (2), is arranged in the insulating housing (5) with the contact element (7), wherein the contact element (7) is connected to the positive pole (3) and to the negative pole (4).

Figure 3:
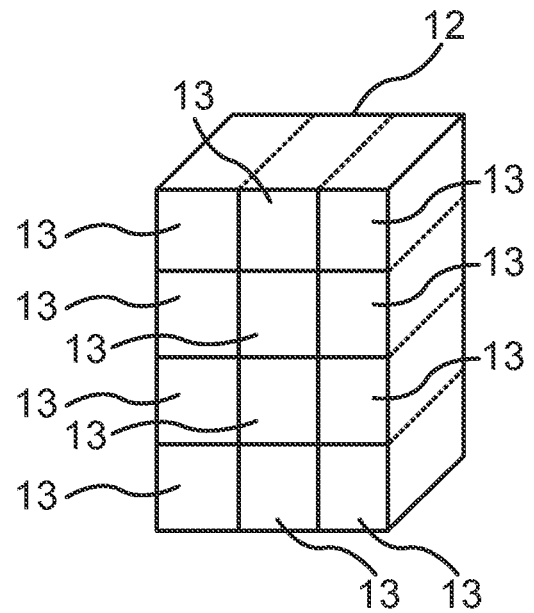
FIG. 3 a schematic perspective view of a framework of a battery system, which is provided with multiple receptacles for receiving respective battery modules.

FIG. 3 shows in a schematic perspective view a framework 12, which in this instance is a rack. Said framework 12 is provided with multiple receptacles 13, each of which is able to receive a battery module 1. The battery modules 1 are received in the respective receptacles 13 of each insulating housing 5 and may be received as battery device 11 in the respective receptacles 13. During installation the battery module (1) is arranged in one of the receptacles (13) of the framework (12).

Figure 4:
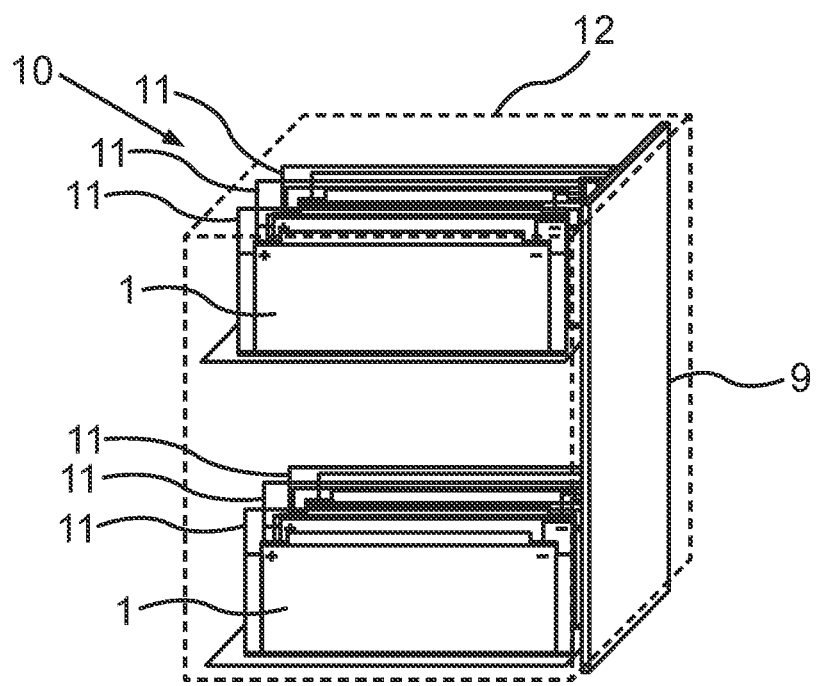
FIG. 4 a schematic perspective view with multiple battery modules housed in the framework, wherein said battery modules may be connected to an electronics unit via respective contact elements.

FIG. 4 shows the battery system 10 in a schematic internal view. Framework 12 is indicated with a broken line. As described in connection with FIG. 3, each of the receptacles 13 of framework 12 holds a battery device 11. The contact element 7 of the battery device 11 is connected in the state of the battery device 11 as received in the respective receptacle 13 to a not-depicted contact device of the battery system 10. The contact element 7 is connected to the electronics unit 9 of the battery system 10 via the contact device. Thus, the positive pole 3 and the negative pole 4 are connected to the electronics unit 9 with the respective battery device 11 via the contact element 7 and the contact device. The electronics unit 9 is disposed on the framework 12 and facilitates the interconnection and control of multiple battery devices 11 or battery modules 1 respectively. When operating the battery system 10, the electronics unit (9) controls and interconnects the battery module (1) with at least one further battery module (1). To ensure that an energy transfer from or to the electronics unit 9 of the battery system 10 only takes place when contact is made between the contact element 7 and the contact device, the contact device may include a contactor.

The battery system 10 is based upon the recognition that an assembly of a high-voltage battery storage requires a large area as well as electricians that are trained specifically for this application. To this end supplied battery modules 1, which consist of a defined number of secondary cells 2, are interconnected to the battery system 10. A number of processing steps are carried out in this instance at more than 60 Volt, which requires corresponding safety measures. Moreover, an increased availability of individual battery modules 1 is to be expected in future at production plants as well as in workshops. Due to their advanced age or due to a change in motor vehicle model they are often no longer suitable to be installed in a vehicle battery for the respective motor vehicle. However, proper recycling of such battery modules 1 is expensive due to the necessity of transporting dangerous goods. In addition to that, said battery modules 1 often still have approximately 80 percent of their original capacity, which could well be utilized in stationary applications.

The insulating housing 5 is provided to facilitate a particularly effective utilization of the still available capacity of the respective battery modules 1. Through said insulating housing 5, which is a standardized module housing for the battery module 1, the aim is to make it possible for untrained workers to undertake the assembly of a stationary storage battery, which presently is the battery system 10. Said stationary storage battery, or the battery system 10 respectively, can be utilized directly on site, in particular at the manufacturing plant or in the workshop, for balancing out load spikes, which were caused, for example, by charging stations, to support the mains grid and thus save on costs. This makes it possible to advantageously utilize the capacity of the battery module 1 in a particularly simple way and thus make use of savings potentials in energy costs. Moreover, battery modules 1 stored in a warehouse may be utilized even if they can no longer be used as a vehicle battery due to a change in model of the produced motor vehicle.

Moreover, a cost-effective assembly of the storage battery is possible with the battery module 1. The battery system 10 also provides modular scalability so that an available space can be optimally utilized, allowing the battery system 10 to be flexibly adapted to any application. Due to the arrangement of the battery module 1 in the insulated housing 5, training of workers is not necessary, which makes decentralization possible, saving on high transport costs as well as training costs, and providing for a contact-protected system for the assembly of the storage battery.

The battery module 1 has a voltage of less than 60 Volt so that it can be moved without specially trained workers. Said battery module 1 is inserted into housing 5. Through this contact is made with the positive pole 3 and the negative pole 4 as connecting poles to contact element 7, which is a standardized plug at an end face of housing 5. Housing 5 is designed such that an incorrect insertion of the battery module 1 into the insulated housing 5 is made difficult or is prevented. Individual cell voltages of the secondary cells 2 are brought out from housing 5 via the contact element 7. Through the arrangement of battery module 1 on housing 5, the battery module 1 is fastened in housing 5 and is made to be contact-proof. Individual battery devices 11 can be connected together in framework 12, which is a special rack, in a few easy steps to a complete battery, in particular the battery system 10, in that respective battery devices 11 are pushed into empty receptacles 13, presently empty slots, and which snap into place there. To facilitate this, all control and power electronics are integrated into the electronics unit 9 in a rear wall of framework 12. Through inserting the respective battery devices 11 into framework 12 in a plug and play manner, said battery devices 11 can be combined into an energy storage unit, presently a storage battery. In this instance the control electronics of the electronics unit 9 recognizes individual cell voltages of the secondary cells 2 or the respective battery modules 1 and interconnects those automatically in the best possible way so that the user of the battery system 10 only needs to push the respective battery device 11 into a free slot. The electrical interconnection of the battery module 1 with at least one further battery module 1 may be accomplished via at least one contactor of housing 5, which has the advantage that the battery device 11 is completely de-energized when removed from framework 12. Alternatively or in addition, the electronics unit 9 or the contact device in the rear wall of framework 12 respectively can be used to electrically interconnect the battery module 1 with the at least one further battery module 1. To retain modularization, empty slots or empty receptacles 13 respectively may be bypassed, presently by means of a bypass.

In summary the examples demonstrate how, through the invention, a modular housing with contact-protected assembly of a stationary battery system can be provided.

The invention claimed is:

1. A battery system, comprising:
a battery module with multiple secondary cells, wherein each secondary cell of the multiple battery cells is located in a respective receptacle;
a framework having a rear wall configured to combine the multiple secondary cells, wherein each secondary cell is configured to be inserted into the framework in a plug and play manner, said battery module is provided with a positive pole and a negative pole, the battery module is located inside an insulating housing with a contact element, which is connected to the positive pole and the negative pole and through which the positive pole and the negative pole are configured to be connected to an electronics unit that is configured to recognize individual cell voltages of each secondary cell.

2. The battery system according to claim 1, wherein the housing is an acid-proof material.

3. The battery system according to claim 1, wherein a traction battery or a starter battery for a motor vehicle is received in the insulating housing as the battery module.

4. The battery system according to claim 1, wherein the contact element comprises a contactor.

5. The battery system of claim 1, wherein
the contact element is configured to be connected to the electronics unit via a contact device.

6. The battery system according to claim 5, wherein the contact device comprises a contactor.

7. The battery system according to claim 5, wherein the battery system is designed as a stationary storage battery for the purpose of balancing out the load spikes of a mains grid.

* * * * *